Oct. 8, 1968  J. A. LACKEY  3,404,918
POWER OPERATED TAIL GATE LATCH FOR DUMP TRUCK
Filed Sept. 28, 1966  2 Sheets-Sheet 1
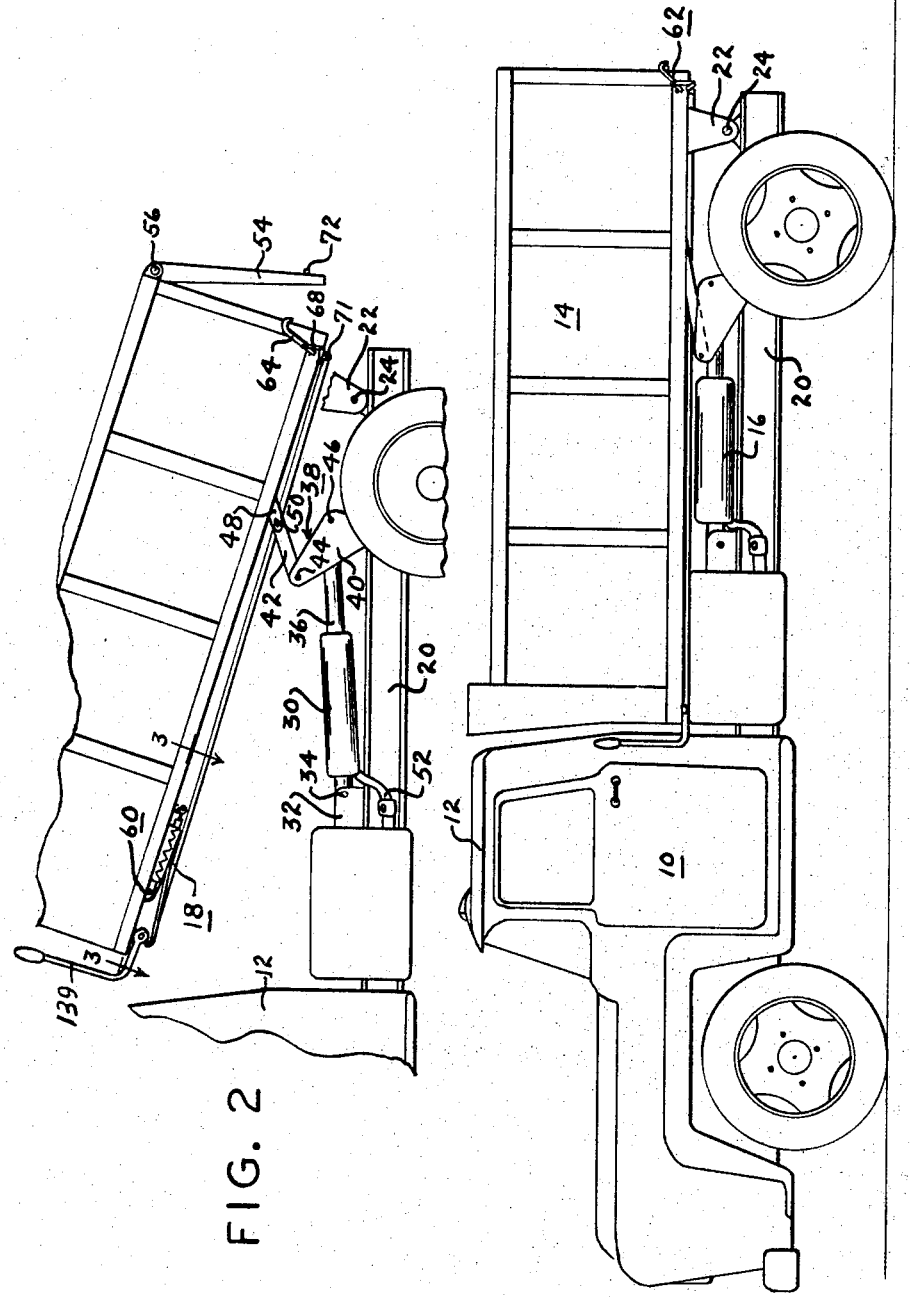
INVENTOR.
JOSEPH A. LACKEY
BY
ATTORNEY Oct. 8, 1968  J. A. LACKEY  3,404,918
POWER OPERATED TAIL GATE LATCH FOR DUMP TRUCK
Filed Sept. 28, 1966  2 Sheets-Sheet 2

INVENTOR.
JOSEPH A. LACKEY
BY M. A. Hobbs
ATTORNEY

United States Patent Office 3,404,918
Patented Oct. 8, 1968

3,404,918
POWER OPERATED TAIL GATE LATCH FOR DUMP TRUCK
Joseph A. Lackey, 2450 Blake Road, Portage, Ind. 46368
Filed Sept. 28, 1966, Ser. No. 582,668
5 Claims. (Cl. 298—23)

ABSTRACT OF THE DISCLOSURE

A mechanism for operating a dump truck in which the hydraulic system of the truck is used to operate the tailgate latching mechanism as the body is lifted and lowered. The mechanism includes a pair of spaced shafts mounted on the underside of the body and interconnected with one another and with the latch for the tailgate, the mechanism having an over-center position which firmly holds the latching mechanism in its locked position.

In the conventional dump truck, a hydraulic power mechanism and control system is employed to lift or tilt the truck bed rearwardly to discharge the load, and after the front end of the bed has been raised, the operator manually releases the tailgate, generally with the use of a lever mounted near the forward end of the bed and connected to the tailgate latch by a mechanical linkage. This arrangement usually requires the driver to leave the cab or to reach therefrom to grasp and operate the tailgate latch release lever. This is not only inconvenient and time consuming, but also often requires substantial manual force to operate the lever after the bed has been elevated ready for dumping. It is therefore one of the principal objects of the invention to provide a power operated tailgate release mechanism which automatically operates the release when the bed is raised to dump position and which automatically re-latches the tailgate when the bed is lowered.

Another object of the invention is to provide a tailgate operating mechanism for dump trucks which is operated hydraulically from the system for raising and lowering the bed and which positively locks the latch operating mechanism without the assistance of the hydraulic operating mechanism, and which firmly retains the latch in its locked position until the mechanism is intentionally operated to release the tailgate.

A further object of the invention is to provide a tailgate latching mechanism for dump trucks, which can be either power or manually operated to release and lock the tailgate when the bed has been raised for dumping, and which can be operated manually to release the tailgate when the bed is in its lowered position.

Still another object is to provide a tailgate latch operating mechanism of the aforesaid type, which operates effectively to release the tailgate and dump the load, and which is reliable and substantially service and trouble free.

Additional objects and advantages of the invention will become apparent from the following description and accompanying drawings, wherein:

FIGURE 1 is a side elevational view of a dump truck having installed therein the present tailgate latch operating mechanism;

FIGURE 2 is a fragmentary view of the truck shown in FIGURE 1, showing the bed of the dump truck lifted and the tailgate unlatched;

Figure 3:
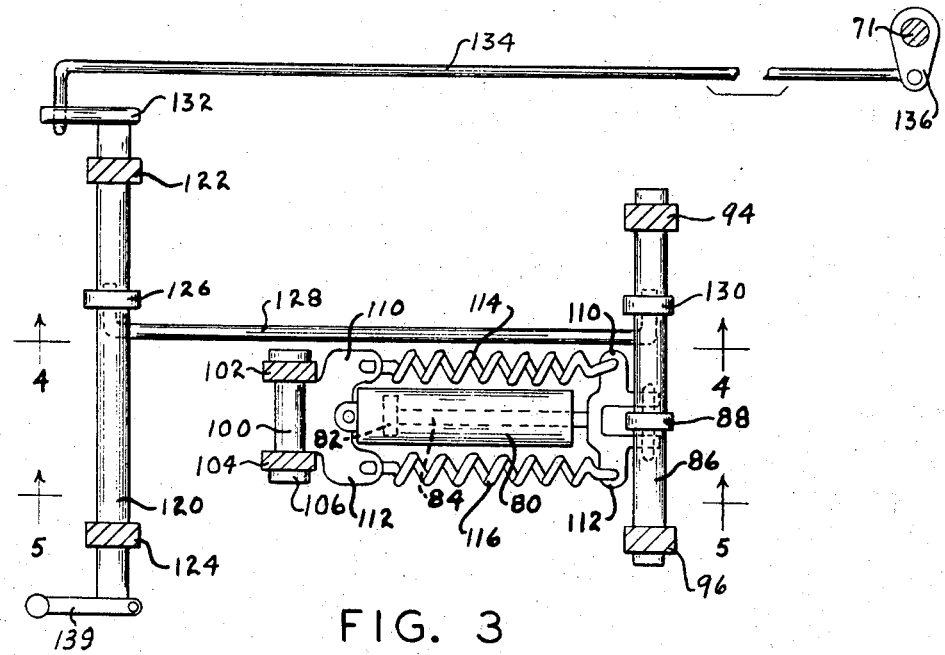
FIGURE 3 is an enlarged top plan and cross sectional view of a portion of the tailgate latch operating mechanism, the section being taken on line 3—3 of FIGURE 2.
Figure 4:
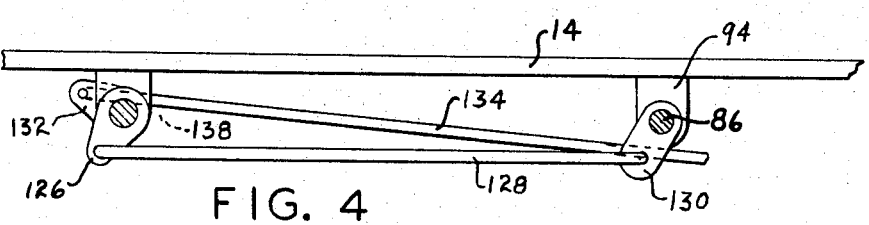
FIGURE 4 is a vertical cross sectional view of the mechanism shown in FIGURES 2 and 3, the section shown being taken on line 4—4 of the latter figure.
Figure 5:
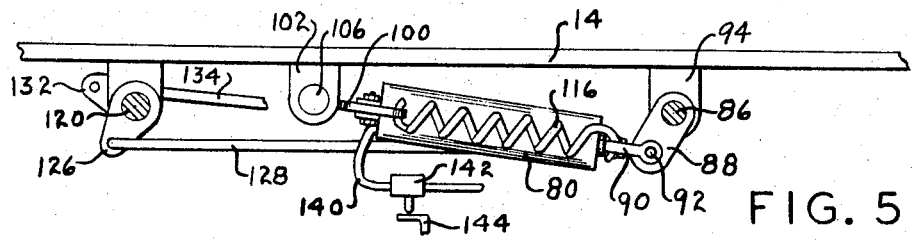
Figure 6:
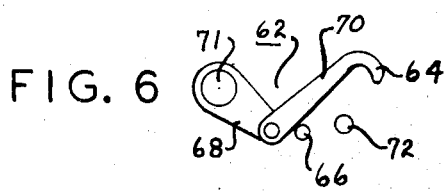

FIGURE 5 is a further vertical cross sectional view of the mechanism shown in FIGURES 2, 3 and 4, the section being taken on line 5—5 of FIGURE 3; and FIGURE 6 is an enlarged fragmentary elevational view of a portion of the latch mechanism shown in FIGURES 1 and 2.

Referring more specifically to the drawings, and to FIGURES 1 and 2 in particular, numeral 10 designates generally a dump truck having a cab 12, dump bed or body 14, bed lifting mechanism 16, and the present tailgate operating mechanism 18. The present tailgate latch operating mechanism may be used on a variety of different types of dump trucks, and would normally be used in conjunction with the hydraulic system used to raise the dump truck bed. It may, however, be used in conjunction with trucks operated in different ways, and with different types of bed raising and lowering mechanisms.

The truck shown in the drawings includes a frame 20 and a bed support 22 pivoted to the rear end of the frame on pivot means 24, support 22 being connected rigidly to the underside of the bed. A portion of the support is shown broken away in FIGURE 2 to permit better illustration of the latch operating mechanism. In the truck shown in the drawings, the bed is raised by a hydraulic cylinder 30 secured to frame 20 by a support member 32 to which the hydraulic cylinder is pivoted by pivot means 34. The rod 36 of the cylinder is connected to an operating linkage 38 consisting of a lever means 40 pivoted to frame 20 and a lever 42 pivoted to lever 40 by pivot means 44, rod 36 being pivoted to lever 40 by pivot means 46. Rod 42 is pivoted to the underside of the bed by bracket 48 and pivot means 50. When the hydraulic cylinder is operated from a hydraulic pump and system, shown only at numeral 52, levers 40 and 42 are extended, thus pivoting the bed on pivot means 24 from the position shown in FIGURE 1 to the position shown in FIGURE 2. The bed is provided with a tailgate 54 pivoted to the upper rear edge of the sides of the bed at pivot means 56, and hence swings outwardly at the bottom from the position shown in FIGURE 1 to the position shown in FIGURE 2, to permit discharge of the load from the bed. The foregoing parts of the truck may be considered conventional for the purpose of the description herein.

The tailgate latch operating mechanism consists of two principal parts, indicated by numerals 60 and 62, the latter being primarily the latch mechanism and linkage therefor. The latch, as shown in the drawings, consists of a hook 64 riding on guide pin 66 and connected to lever 68 by hook lever 70, lever 68 being pivotally connected to hook lever 70 and rigidly connected to a rotatable operating shaft 71. When shaft 71 is rotated in the counter-clockwise direction during the operation of mechanism 62, hook 64 is disengaged from pin 72 on the tailgate, and when the shaft is rotated in the clockwise direction, hook 64 is moved to the position to engage the pin and hold the tailgate in closed position. Shaft 71 is secured to the underside of the bed by a plurality of brackets.

Operating mechanism 60 consists of a hydraulic cylinder 80 having a piston 82 therein and a piston rod 84 connected to the piston and to a rotatable shaft 86 by a lever 88 and linkage 90, lever 88 being rigidly connected to shaft 86 and pivotally connected to linkage 90 by pivot means 92. Shaft 86 is supported on the underside of the truck bed by brackets 94 and 96, which form bearing means for the rotatable shaft 86. The opposite end of cylinder 80 is anchored to the underside of the bed by linkage 100 and brackets 102 and 104 secured to the underside of the bed and pivotally supporting linkage 90 by pivot means 106 extending through brackets 102 and 104. The two linkages 90 and 100 are provided with lateral extensions 110 and 112, and the respective extensions are connected by coil springs 114 and 116, which operate in opposition to the hydraulic cylinder.

A rotatble shaft 120 is mounted on support brackets 122 and 124, rotatably supporting shaft 120, and is provided with a lever 126 which is connected to shaft 86 by a longitudinally movable shaft 128 and a lever 130 rigidly mounted on shaft 86. Rotational movement of shaft 86 is thereby transmitted to shaft 120. Rigidly mounted on the end of shaft 120 is a lever 132 which is connected by a rod 134 to lever 136 rigidly mounted on shaft 71 for rotation therewith. It is seen that movement of the hydraulic cylinder by hydraulic fluid rotates shafts 86 and 120 in the counter-clockwise direction and moves lever 132 in the counter-clockwise direction to move shaft 134 from left to right, as viewed in FIGURES 3 and 4. Springs 114 and 116 rotate shafts 86 and 120 and lever 132 in the clockwise direction, and hence move rod 134 in the direction to lock the latch. One important feature of the mechanism 60 is that lever 132 is positioned above a horizontal center line 138, thereby making an over-center latching means for positively retaining the tailgate latch in closed position. With this relationship, pressure on the tailgate latch will result in a greater force holding the latch in closed position. The foregoing mechanism may be operated manually by lever 139 connected to the end of shaft 120, as seen in FIGURES 2 and 3.

The hydraulic cylinder 80 is operated from the hydraulic system which raises and lowers the truck bed, the cylinder being connected to the hydraulic system by a line 140. When the hydraulic cylinder 16 is operated by the conventional pump and control valves of the lift operating system, the hydraulic fluid is transmitted to cylinder 80 through line 140, thereby moving piston 82 to the right, as viewed in FIGURE 3. This, in turn, rotates shafts 86 and 120 in the counter-clockwise direction, moving lever 132 from its over-center position in a counter-clockwise position sufficiently to move rod 134 to rotate shaft 71 sufficiently to release hook 64 from pin 72. The hydraulic cylinder 80 remains under pressure to retain the latch in its unlocked position until the bed is lowered to its lowermost position and the tailgate has swung inwardly against the end of the truck bed.

When the bed has been lowered to its fully closed position, a check valve 142 in line 140 releases the pressure in cylinder 80, thereby permitting springs 114 and 116 to rotate shafts 86 and 120 in the clockwise direction and return rod 134 and lever 132 to their over-center positions, as illustrated in FIGURE 4. When the rod and lever 132 are in this position, hook 64 is in its lowermost position with its free and engaging pin 72 and retaining the tailgate in closed position. The check valve 142 may be operated by an abutment or bracket 144 on the frame engaging the valve stem to open the valve when the bed approaches its fully lowered position.

In the operation of a truck having the present tailgate latch mechanism thereon, the truck bed or body 14 is normally loaded with the tailgate fully latched and the bed in the position illustrated in FIGURE 1. When the bed is to be dumped, the driver operates the controls for the hydraulic system which delivers hydraulic fluid under pressure to cylinder 16 and through hydraulic line 140 to cylinder 80. As the bed is being raised, the hydraulic pressure in cylinder 80 causes the piston 82 and rod 84 to move from the positions shown in FIGURE 3 to the right, thereby rotating shafts 86 and 120 in the clockwise direction, as viewed in FIGURES 4 and 5, causing lever 132 to move downwardly from its over-center position, and thence moving rod 134 to the right. This causes shaft 71 to rotate in the counter-clockwise direction, as viewed in FIGURE 6, causing levers 68 and 70 to move upwardly, lifting hook 64, thereby disengaging it from pin 72. When the bed is in its raised position illustrated in FIGURE 2, the released tailgate swings rearwardly at the bottom, permitting the load in the bed to slide therefrom. When the bed is lowered, the tailgate swings inwardly to its fully closed position, and upon release of the hydraulic fluid in cylinder 80 by actuation of valve 142, springs 114 and 116 move lever 132 to its over-center position and rod 134 to the left to bring hook 64 downwardly into engagement with pin 72, thus locking the tailgate closed.

Normally, a latch is provided at each end of the tailgate and shaft 71 would extend the full width of the bed at the rear thereof to simultaneously operate a hook corresponding to hook 64 on the opposite side of the bed. However, both latch mechanisms are operated by single operating mechanism 60 through rod 134.

While only one embodiment of the present invention has been described in detail herein, various changes and modifications may be made without departing from the scope of the invention.

I claim:

1. An operating mechanism for a dump truck having a hydraulic system and a dump bed with a tailgate and a latch therefor having a fixed part on the tailgate and a movable part on the truck bed for engaging the fixed part, said mechanism comprising a means for moving said movable part between latched and unlatched positions, a rotatable shaft, a support means for mounting said shaft on the dump truck bed, a lever on said shaft rotatable to an over-center position, a rod connected at one end to said lever and at the other end to said means for latching and unlatching said movable part, and a power operating means for shifting said lever from said over-center position in the direction to unlatch said movable part, including a hydraulic cylinder for rotating said shaft in the direction to release the movable part of the latch, a spring operating in opposition to said hydraulic cylinder for rotating said shaft in the opposite direction to latch said movable part and to place the lever on said shaft in its over-center position, a second shaft parallel to said first shaft, and a linkage consisting of a lever on each of said shafts and a rod interconnecting the two levers for transferring force of said hydraulic cylinder and springs between said shafts.

2. An operating mechanism for a dump truck tailgate latch as defined in Claim 1, in which a manually operated lever is connected to said second shaft to operate said lever and rod to move the movable part between its latched and unlatched positions.

3. An operating mechanism for a dump truck having a hydraulic system and a dump bed with a tailgate and a latch therefor having a fixed part on the tailgate and a movable part on the truck bed for engaging the fixed part, said mechanism comprising a means for moving said movable part between latched and unlatched positions, a rotatable shaft, a support means for mounting said shaft on the dump truck bed, a lever on said shaft rotatable to an over-center position, a rod connected at one end to said lever and at the other end to said means for latching and unlatching said movable part, and a power operating means for shifting said lever from said over-center position in the direction to unlatch said movable part, including a hydraulic cylinder for rotating said shaft in the direction to release the movable part of the latch, a spring operating in opposition to said hydraulic cylinder for rotating said shaft in the opposite direction to latch said movable part and to place the lever on said shaft in its overcenter position, a hydraulic line connecting said hydraulic cylinder to the hydraulic system in the truck, and a valve in said line operable in one position to hold said hydraulic cylinder in its extended position and automatically operable when the bed of the dump truck is lowered to release the entrapped fluid in the hydraulic cylinder.

4. An operating mechanism for a dump truck tailgate latch as defined in claim 3, in which said means for moving said movable part between latched and unlatched positions includes a shaft parallel to said first mentioned shaft, and a lever on said last mentioned shaft, said rod being connected to said last mentioned lever for rotating said last mentioned shaft when said first mentioned shaft is rotated.

5. An operating mechanism for a dump truck tailgate latch as defined in claim 4, in which a manually operated lever is connected to said second shaft to operate said lever and rod to move the movable part between its latched and unlatched positions.

References Cited

UNITED STATES PATENTS

| | | |
|---|---|---|
| 2,552,442 | 5/1951 | McClish. |
| 2,856,233 | 10/1958 | Boyce. |
| 2,868,583 | 1/1959 | Harbers. |
| 2,983,548 | 5/1961 | Harbers. |
| 3,111,346 | 11/1963 | Harbers. |

FOREIGN PATENTS

| | | |
|---|---|---|
| 213,520 | 3/1958 | Australia. |

RICHARD J. JOHNSON, *Primary Examiner.*